M. L. GIBBS.

Improvement in Plows.

No. 4,943. Reissued June 11, 1872.

Witnesses.
J. H. Burridge
D. L. Dumphrey.

Inventor
M. L. Gibbs.
Per Burridge & Co.
Attys

A.M. PHOTO-LITHOGRAPHIC CO. N.Y. (OSBORNE'S PROCESS.)

UNITED STATES PATENT OFFICE.

MARTIN L. GIBBS, OF CANTON, OHIO.

IMPROVEMENT IN PLOWS.

Specification forming part of Letters Patent No. 116,048, dated June 20, 1871; reissue No. 4,943, dated June 11, 1872.

*To all whom it may concern:*

Be it known that I, MARTIN L. GIBBS, of Canton, Stark county, Ohio, have invented certain new and useful Improvements in Plows; and that the following is a full, clear, and exact specification thereof.

*Nature and Object of my Invention.*

My invention relates to an improved manner of securing the colter on the plow, and to an improved construction for facilitating the adjustment of the colter; and the first part of my invention consists in the combination, with the plow-colter, of a colter-head, secured on the under side of the plow-beam, and formed to receive the upper end of the colter, and of a tension-bolt arranged between the colter and standard, and serving to hold the colter in the colter-head and on the share-point, by which means I secure the colter firmly on the plow without the necessity of mortising and thus weakening the beam, and also effect a saving in the length of the colter, and make the plow of a more neat and finished appearance. The second part of my invention consists in the arrangement of the plow-colter in a flaring seat in the colter-head or plow-beam, and between set-screws arranged in the colter-head or beam, and bearing upon the opposite sides and near the front edge of said colter, which arrangement affords a very convenient means of throwing the colter "into" or "out of land," in order to change the width of furrow to suit different teams or different kinds of soil. The third part of my invention consists in the combination of a rear set-screw or pitch-screw with the colter-head, by means of which the pitch of the colter can be increased as the front and under side of the colter wears away, in order to overcome the tendency which this wearing away has to cause the plow to rise up out of the furrow.

SPECIFICATION.

Figure 1:
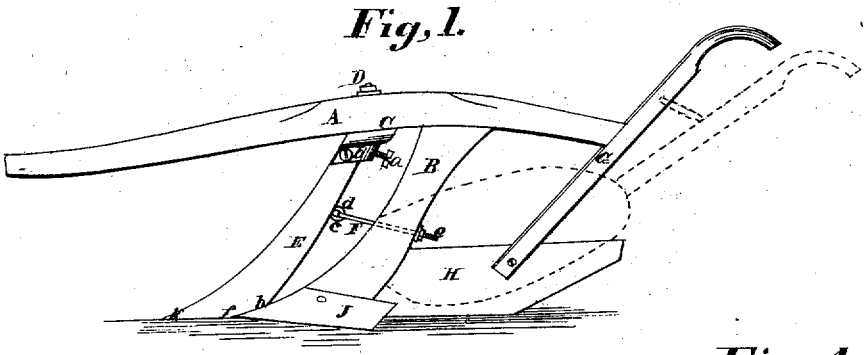
Figure 4:
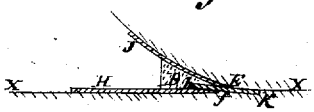
Figure 2:
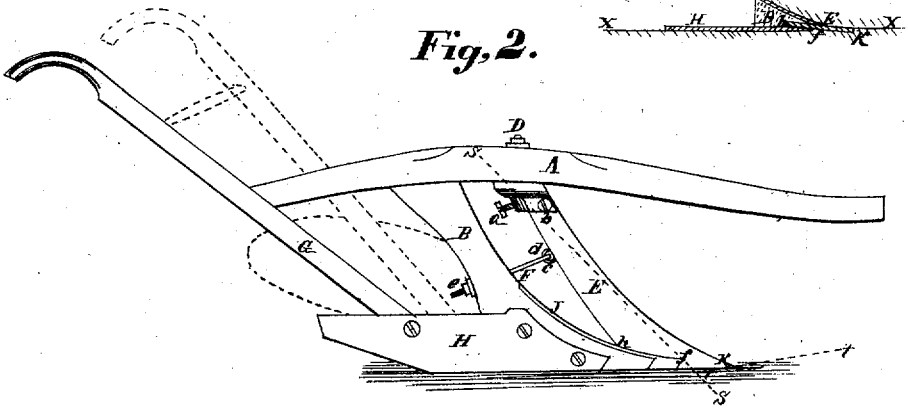
Figure 3:
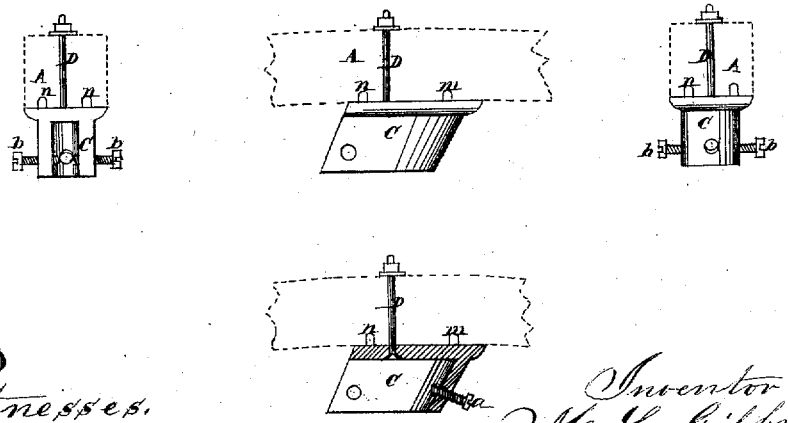

Figure 1 is a side view of a plow embodying my invention taken from the mold-board side. Fig. 2 is another side view of the same taken from the land-side. Fig. 3 are front, side, and rear views, and longitudinal section of colter-head. Fig. 4 is a diagram, showing the manner and effect of the lateral turning of the colter.

A represents the plow-beam; B, the plow-standards; G, the land-side handle; H, the land-side; and J, the share, all of which are constructed and united in an ordinary manner. The mold-board and handle connected thereto are simply indicated by dotted lines, as they have no essential connection with the construction about to be explained. The colter-head is conveniently made of malleable cast-iron, or of common cast-iron, and is of the general form shown in Fig. 3, the upper part being a flat plate, and the lower part being of a U-form. The dowel-pins *n n m* are cast on the upper side of the head C, and fit into holes bored in the under side of the beam A, and the head is firmly held to the beam by the clamping-bolt D, which has its head countersunk in the head C, as shown in section in Fig. 3, and which passes up through a hole in the beam A, where it is secured by a nut and washer, as shown in Figs. 1 and 2. The colter E has a notch, *h f*, cut in its lower end, as shown in Figs. 1 and 2, so that it sets over the share J in such a manner as to bring the center of its lower end nearly over the share-point, as shown. The lower end of the colter is held against lateral movement by a teat on the point of the share J, which fits in a hole in the front of the notch *h f*, as is more fully shown in Letters Patent of the United States granted to me October 25, 1870, for improvement in plows. The upper end of the colter E fits in the U-shaped part of the head C, and the colter is firmly held in said head, and on the share J by the tension-bolt or brace F, which is connected by an eye, *d*, with the eye-piece *c* secured in the colter E, and which passes through the standard B, and is held by a nut, *e*, on the rear side of said standard, as shown. The side set-screws *b b* are inserted in holes in the sides of the head C, and press against the sides and near the front edge of the colter E, and the rear set-screw *a* is inserted in a hole in the back of the head C and presses against the upper end and rear edge of the colter. The lower U-shaped part of the head C is made a little wider at the mouth than at the back, and the back of the colter E is made to fit in the back of this head C, so that by loosening one screw, *b*, and turning up the other, the colter E can be turned around an axis, as represented by the line *s s*, drawn from the upper and rear corner of the colter E through the point of the share J, by which means the point *k* of the colter E can be brought nearer to or further from the land-line X X, as represented in Fig. 4, which is technically called "throwing the colter into" or "out of land," and the object of which is to cause the plow to cut a greater or lesser width of furrow, as may be found desirable in plowing with different teams or in different kinds of land.

The old method of throwing the colter into or out of land was by twisting the body of the colter, which usually made it necessary for the farmer to remove the colter from the plow, and take it to a blacksmith to have such twist made, which involved a loss of time, and was an uncertain method of obtaining any required change of land; whereas, by the use of the set-screws *b b*, he can easily change the angular position of the colter in the field at any time and with the greatest precision.

In working the plow, the lower end of the colter E is liable to be worn off obliquely, as indicated by the dotted line *t t*, and when worn off in this manner the tendency is for the plow to draw out of the ground on the line *t t*, and thus not take a proper depth of furrow. To overcome this difficulty, with my improved construction, the farmer simply loosens the nut on the tension-bolt F, and turns the set-screw *a* forward, which, as is readily seen, throws the upper end of the colter forward, and brings the point *k* of the colter down into line with the bottom of the land-side.

It is evident that the side set-screws *b b* can be adapted to the ordinary construction of plows in which the colter is passed through a mortise in the beam, as by widening the front end of the mortise and inserting the screws through the side of the beam, the angular position of the colter could be changed as desired. Where the angular change of position in the colter is not required, the U-shaped part of the head C could be made to fit up to the sides of the colter E, so as to dispense with the screws *b b*, and the flexible fastening *d c* for the tension-bolt F, could be dispensed with; and where such joint is required, it can be formed without the eye *c*, by making a hole in the colter for the eye *d* of the bolt F, as is readily seen. The object of the dowel-pins *n n m* on the head C is to prevent any movement of said head on the beam, and I consider these pins as the simplest means of effecting this result; but the same result might be attained by cutting the seat for the head in the beam, or by using two clamping-bolts.

*Claims.*

Having thus fully described my invention, what I claim therein as new and of my invention, and desire to secure by Letters Patent, is—

1. The colter-head C and tension-bolt F, in combination with the colter E, plow-beam A, and standard B, the several parts being arranged as and for the purpose specified.

2. The arrangement of the colter E in a flaring seat in the colter-head C or beam A, and between the side set-screws *b b*, as arranged as described, and for the purpose specified.

3. The combination of the pitch-screw *a*, colter-head C, colter E, and tension-bolt F, the several parts being arranged in the manner, and for the purpose specified.

4. The tension-bolt F, colter E, and colter-head C, in combination with the standard B, and a plow-beam, the tension-rod being secured directly to the colter, substantially in the manner as and for the purpose set forth.

MARTIN L. GIBBS.

Witnesses:
W. H. BURRIDGE,
JOHN A. RYAN.